United States Patent
Dubé et al.

(10) Patent No.: US 6,874,753 B2
(45) Date of Patent: Apr. 5, 2005

(54) REFRIGERATION MODULATING VALVE SEALING DEVICE

(76) Inventors: Serge Dubé, 2595 Du Bourgogne, St-Lazare, Québec (CA), J7T 2C1; Richard Charron, 5463 Kennedy Sud, Rock Forest, Québec (CA), J1N 2L2; Luc Tremblay, 45 Le Boisé, Côteau du Lac Québec (CA), J0P 1B0; Mario Daigle, 517 Bernard Pilon, Beloeil, Qué(CA), J3G 1V3

(*) Notice: Subject to any disclaimer, the term of this patent is extended or adjusted under 35 U.S.C. 154(b) by 141 days.

(21) Appl. No.: 10/191,063

(22) Filed: Jul. 10, 2002

(65) Prior Publication Data

US 2004/0007684 A1 Jan. 15, 2004

(51) Int. Cl.[7] .............................................. F16K 51/00
(52) U.S. Cl. ...................................... 251/214; 251/357
(58) Field of Search ................................. 251/214, 357

(56) References Cited

U.S. PATENT DOCUMENTS

| | | | | |
|---|---|---|---|---|
| 3,405,947 A | * | 10/1968 | Roemer ................. 251/214 X |
| 4,307,745 A | * | 12/1981 | McGee ................... 251/214 X |
| 4,509,719 A | * | 4/1985 | Uomala et al. ............. 251/214 |
| 4,601,304 A | * | 7/1986 | Schobl .................... 251/214 X |
| 4,676,268 A | * | 6/1987 | Sano .......................... 251/266 |
| 4,945,941 A | * | 8/1990 | Kocher ................... 251/214 X |

* cited by examiner

Primary Examiner—Eric Keasel
(74) Attorney, Agent, or Firm—Ogilvy Renault

(57) ABSTRACT

A sealing device for a modulating valve of the type having a valve body defining a flow passage, an inlet and outlets, a valve displaceable in the flow passage, and an actuator having an actuator rod rotatably coupled to the valve for displacing the valve in the flow passage. The sealing device comprises a body surrounding the actuator rod. A connector is adapted to secure the body of the sealing device to the valve body. Seals are provided between the body of the sealing device and the actuator rod arid between the body of the sealing device and the valve body, to prevent fluid flow therebetween. The body of the sealing device and the seals are adapted to conceal and contain fluid leaks, whereby no fluid is lost due to a leaking modulating valve.

14 Claims, 2 Drawing Sheets

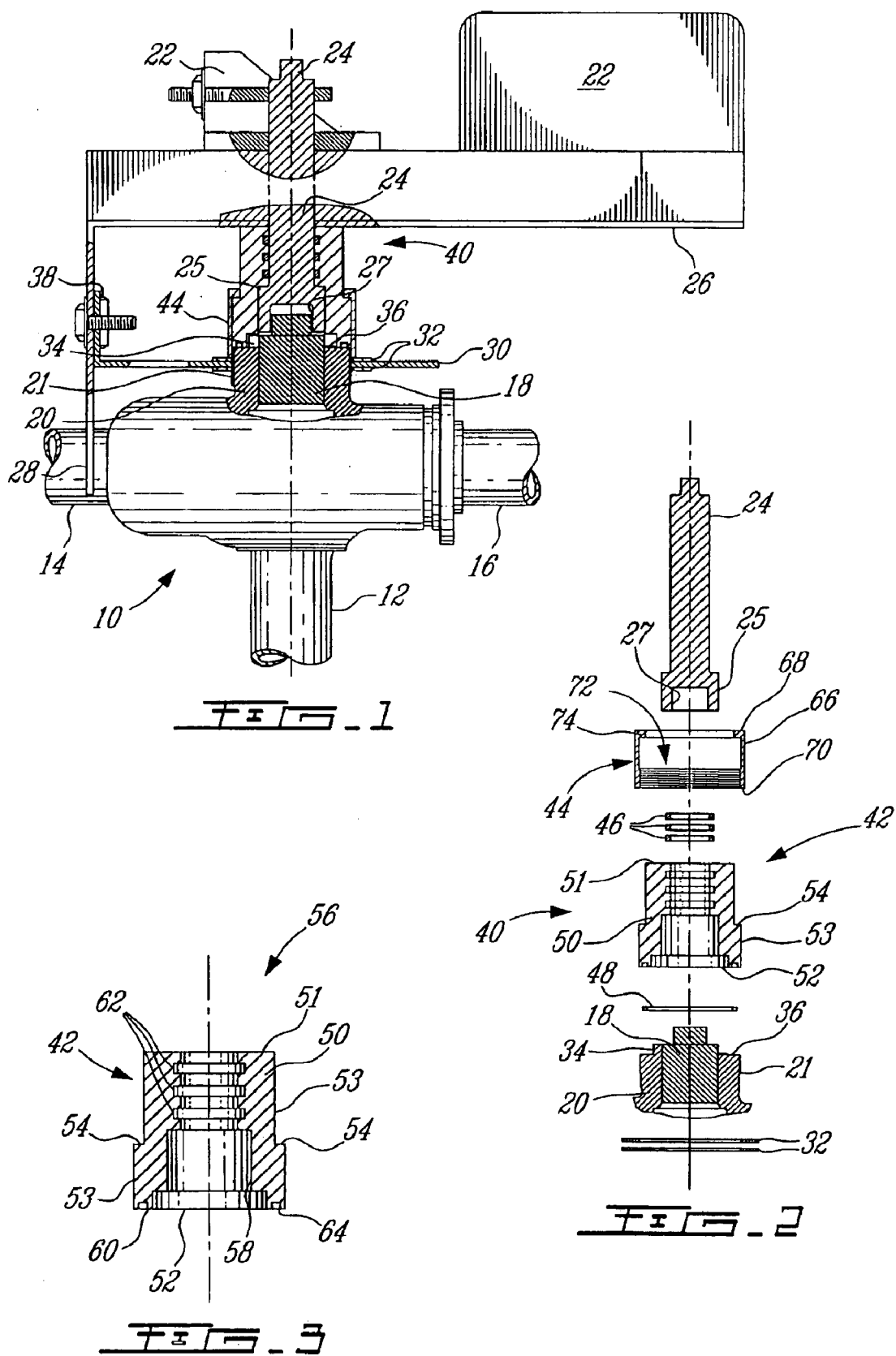

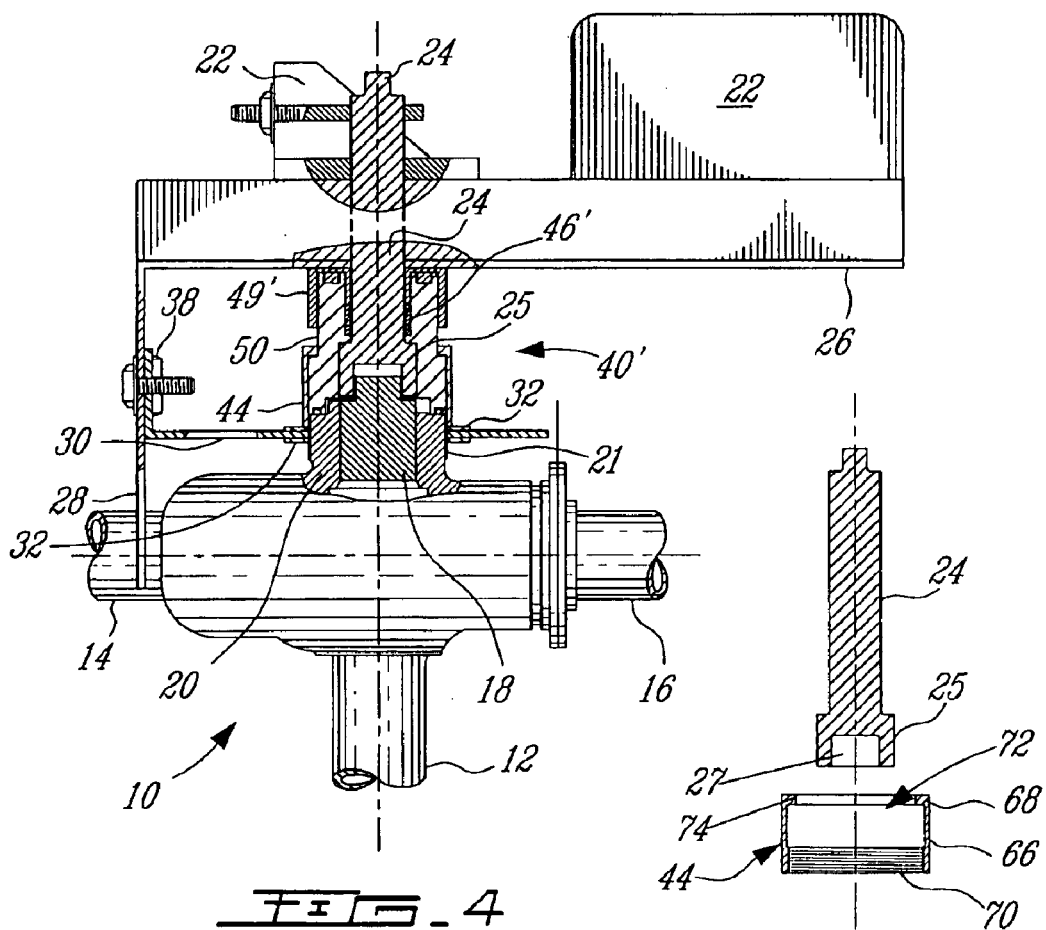
FIG_4
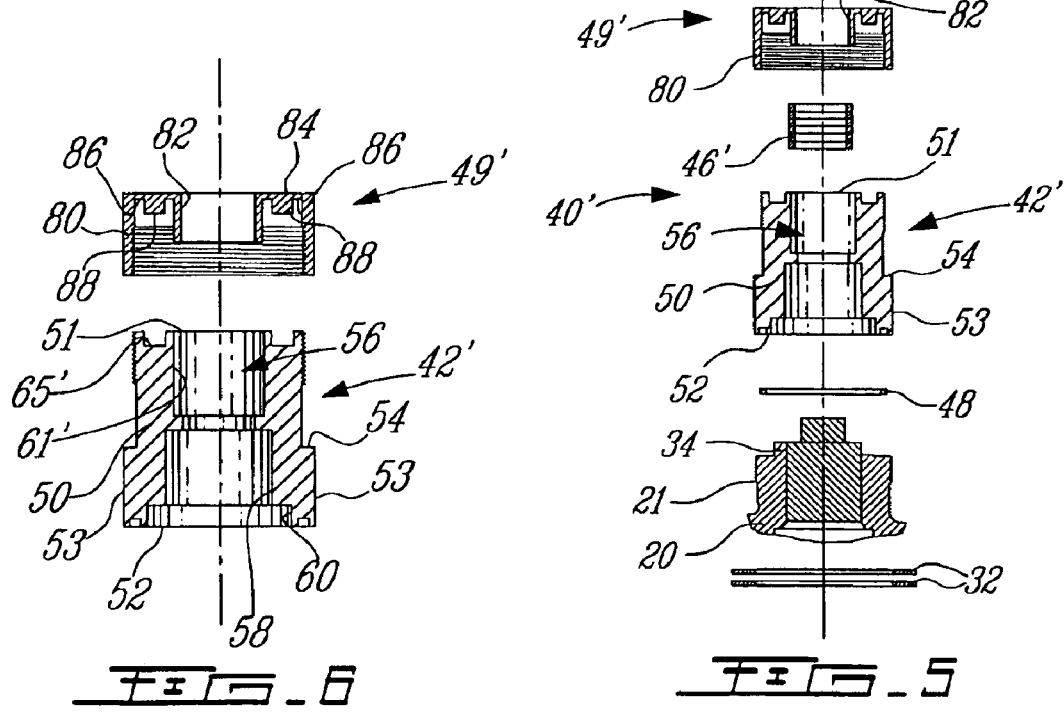
FIG_6
FIG_5

REFRIGERATION MODULATING VALVE SEALING DEVICE

TECHNICAL FIELD

The present invention generally relates to modulating valves used in refrigerant circuits and, more particularly, to a sealing device for preventing refrigerant losses through leaks of modulating valves.

BACKGROUND ART

Various types of modulating valves, such as incrementally positionable valves, are widely used in refrigerant circuits for refrigeration and air-conditioning systems. For instance, modulating valves are frequently used at nodes of diverging loops of circuits to provide refrigerant for heat reclaim or for defrosting evaporators of refrigeration display units. Such valves are also used in split condensers and hot-gas applications. These valves are used to control the ratios of refrigerant conveyed to the various elements of the circuits or to control the flow of refrigerant through the lines. The modulating action of the valves prevents water hammer in the refrigerant lines, which could have adverse effects on the various elements of such circuits. Mueller™ Refrigeration Co. provides such modulating valves, under the name Cycle Master™.

However, the modulating valves of refrigerant circuits are subjected to the harsh conditions typical to circuits. For instance, the refrigerant in refrigerant circuits is at relatively high temperatures and fluctuates between large temperature variations. Furthermore, the refrigerant is compressed to relatively high pressures, and the modulating valves are often employed to create pressure drops in the circuits. Finally, the refrigerants typically known and used are often of a corrosive nature.

For these reasons, some modulating valves have been known to leak at the stem. A plurality of negative effects results from such leaks. For instance, substantial losses of refrigerant can cause inefficient refrigeration cycles and shutdowns. Furthermore, the refrigerants are often harmful to the environment, and refrigerant losses to the environment must be prevented. Finally, downtimes are very costly and are risky as the contents of the refrigeration display units cannot be subjected to temperature increases without the risk of being fouled.

SUMMARY OF INVENTION

It is a feature of the present invention to provide a sealing device for preventing refrigerant loss through a modulating valve.

According to the above features of the present invention, from a broad aspect, the present invention provides a sealing device for a modulating valve of the type having a valve body defining a flow passage, at least one inlet and one outlet, a valve displaceable in the flow passage to control an opening of the flow passage, and actuation means having an actuator rod rotatably coupled to the valve at an exterior of the valve body for displacing the valve in the flow passage, the sealing device comprising a body surrounding the actuator rod of the modulating valve, the body defining a receptacle for accommodating a coupling between the actuator rod and the valve so as not to impede on the actuation of the valve by the actuator rod; connection means adapted to secure the body of the sealing device to the valve body, the connection means being a tubular member being adapted to be threadingly engaged to the valve body, the tubular member compressing the body of the sealing device against the valve body such that a first one of the sealing means is squeezed between the body of the sealing device and the valve body; and sealing means between the body of the sealing device and the actuator rod and between the body of the sealing device and the valve body, to prevent fluid flow therebetween, said body of the sealing device and said sealing means being adapted to conceal and contain fluid leaks between one of the valve and the actuator rod, and the valve body, whereby no fluid is lost due to a leaking modulating valve.

Further in accordance with the present invention, there is provided a sealing device for a modulating valve of the type having a valve body defining a flow passage, at least one inlet and one outlet, a valve displaceable in the flow passage to control an opening of the flow passage, and actuation means having an actuator rod rotatably coupled to the valve at an exterior of the valve body for displacing the valve in the flow passage, the sealing device comprising a body surrounding the actuator rod of the modulating valve, the body defining a receptacle for accommodating a coupling between the actuator rod and the valve so as not to impede on the actuation of the valve by the actuator rod; connection means adapted to secure the body of the sealing device to the valve body; sealing means between the body of the sealing device and the actuator rod and between the body of the sealing device and the valve body, with the sealing means between the, body of the sealing device and the rod being packing, to prevent fluid flow therebetween, said body of the sealing device and said sealing means being adapted to conceal and contain fluid leaks between one of the valve and the actuator rod, and the valve body, whereby no fluid is lost due to a leaking modulating valve; and a cover member connectable to an end of the body of the sealing device distal from the valve body, the cover member having a sleeve accommodatable between the body of the sealing device and the actuator rod to contain the packing therebetween.

BRIEF DESCRIPTION OF DRAWINGS

A preferred embodiment of the present invention will now be described with reference to the accompanying drawings in which:

FIG. 1 is a front elevational view, partly sectioned and fragmented, of a modulating valve having a sealing device constructed in accordance with the present invention;

FIG. 2 is an exploded cross-sectional view of the sealing device in accordance with the present invention;

FIG. 3 is a longitudinal cross-sectional view of a tube portion of the sealing device;

FIG. 4 is a front elevational view, partly sectioned and fragmented, of the modulating valve having a sealing device constructed in accordance with a second embodiment of the present invention;

FIG. 5 is an exploded cross-sectional view of the sealing device constructed in accordance with the second embodiment of the present invention; and FIG. 6 is a longitudinal cross-sectional view of a tube portion of the sealing device constructed in accordance with the second embodiment of the present invention.

DESCRIPTION OF PREFERRED EMBODIMENTS

Referring to the drawings, and more particularly to FIG. 1, a modulating valve is generally shown at 10. The modulating valve 10 is of the three-way type, and has an inlet 12 and outlets 14 and 16. The modulating valve 10 has an actuator stem 18 protruding outwardly from a connection collar 20. The actuator stem 18 is connected to a ball (not shown) in the modulating valve 10, and is actuated to control the position of the ball in the modulating valve 10. For instance, a modulating action on the actuator stem 18 can be performed to control the outputs of the outlets 14 and 16 with respect to one another, or to create a pressure differential between the inlet 12 and the outlets 14 and 16. The connection collar 20 has a threaded peripheral surface 21.

The actuator stem 18 is actuated by an actuator 22 connected to the actuator stem 18 by an actuation rod 24. As shown in FIGS. 1 and 2, the actuation rod 24 has a head portion 25 having a mating hole 27, to be rotatably coupled to the actuator stem 18. Returning to FIG. 1, the actuator 22 is mounted to the body of the modulating valve 10 by a support bracket 26. The support bracket 26 has a first leg 28 riding on the outlet pipe 14 of the modulating valve and a second leg 30 secured to the connection collar 20 by a pair of fasteners 32, which are operatively engaged to the threaded peripheral surface 21. The actuator 22 is typically a Belimo™ or a Neptroric™ motor, whereas the modulating valve 10 is, for instance, a Mueller™ Refrigeration Cycle Master™ valve. Stops 34 (only one of which is shown) are provided on a top annular surface 36 of the connection collar 20, and coact with a radial pin (not shown) on the actuator stem 18 to typically limit the angular displacement of the ball to 90°.

Leaks have been known to occur between the actuator stem 18 and the connection collar 20. Therefore, a sealing device in accordance with the present invention is generally shown at 40, and is mounted to the modulating valve 10 so as to prevent losses of refrigerant from the modulating valve 10.

The sealing device 40, as best shown in FIGS. 2 and 3, has a tube portion 42, a connector portion 44, actuation rod seals 46 and a valve seal 48. The tube portion 42 is shown having a tubular body 50 having a top end 51, a bottom end 52, and an outer peripheral surface 53 with a shoulder 54, generally in a middle area of the tubular body 50. The tubular body 50 has a through bore 56 and a first counterbore 58 concentric with the through bore 56. A second counterbore 60 of larger diameter is concentric with the first counterbore 58. Three radial grooves 62 are positioned in the through bore 56 and are adapted to each receive one of the actuation rod seals 46. The seals 46 are typically of materials well suited for high-temperature refrigerant. For instance, the seals 46 can be in neoprene, nitrile, polytetrafluoroethylene (PTFE), Hypalon™, or any other material well suited for the applications of the modulating valve 10, and may be lip seals, O-rings or any other suitable type of seal. An annular groove 64 is positioned on the bottom end 52 of the tubular body 50, and receives therein the valve seal 48. Similarly to the actuation rod seals 46, the valve seal 48 is made of materials well suited for refrigerant at high temperatures, such as neoprene, nitrile, PTFE, Hypalon™, etc., and can be a lip seal, an O-ring, etc.

The connector portion 44 has a tubular body 66 having a top end 68, a bottom end 70, and a through bore 72. An inner lip 74 projects radially inwardly in the through bore 72 at the top end 68 of the tubular body 66. The tubular body 66 is tapped at the bottom end 70.

Now that the various elements of the sealing device 40 have been described in detail, the assembly of the sealing device 40 to the modulating valve 10 will be described. Prior to the actuator 22 being mounted to the modulating valve 10, the tube portion 42 of the sealing device 40 is axially slid onto the actuation rod 24. The tube portion 42 is sized such that the first counterbore 58 thereof snugly receives the head portion 25 of the actuation rod 24. In doing so, the actuation rod seals 46 seal the passage between the through bore 56 of the tube portion 42 and the actuation rod 24.

The tube portion 42 is positioned on the top annular surface 36 of the connection collar 20, with the bottom end 52 of the tube portion 42 sitting thereon. Accordingly, the valve seal 48 seals the tube portion 42 to the connection collar 20. In positioning the actuation rod 24 on the connection collar 20, the mating hole 27 is rotatably coupled to the actuation stem 18. The actuation rod 24 is free to rotate with respect to the tube portion 42. The second counterbore 60 accommodates the stops 34 and the radial pin (not shown) of the actuator stem 18. The radial pin is free to move in the second counterbore 60.

Thereafter, the connector portion 44 is threadingly engaged through its tapped portion at the bottom end 70 thereof to the threaded peripheral surface 21 of the connection collar 20. The connector portion 44 is sized so as to snugly receive a bottom portion of the tube portion 42. More precisely, the inner lip 74 of the connector portion 44 abuts against the shoulder 54 on the peripheral surface 53 of the tube portion 42. Therefore, as the connector portion 44 is tightened onto the connection collar 20, the tube portion 42 is pulled downwardly so as to squeeze the valve seal 48, thereby securing the sealing therebetween.

It is pointed out that the fasteners 32 must be engaged on the connection collar 20 prior to the connector portion 44 being secured thereto. Furthermore, the second leg 30 of the support bracket 26 may be secured to the modulating valve 10 in a first step, to then have the second leg 30 and the remainder of the support bracket 26 added thereto via bolt and nut 38, once the sealing device 40 has been mounted onto the modulating valve 10. The sealing device 40 does not prevent leaks between the actuator stem 18 and the connection collar 20. However, refrigerant leaks therethrough are concealed and contained by the sealing device 40 such that no refrigerant is lost because of a leaking modulating valve.

The modulating valves 10 can be retrofitted with the sealing device 40. Therefore, the sealing device 40 may be sold separately from the modulating valve 10 as a repair kit. The installation of the sealing device 40 on the modulating valve 10 is readily achieved, whereby the downtime for attending to the modulating valve 10 in case of a leak is greatly reduced.

Referring now to FIGS. 4, 5 and 6, a second embodiment of the present invention is shown, in which packing is used instead of the seals 46 to seal the actuation rod 24. The sealing device in accordance with the second embodiment of the present invention is generally shown at 40'. For clarity purposes, like elements between the first embodiment of FIGS. 1 to 3 and the second embodiment of FIGS. 4 to 6 will bear the same reference numerals. Additional elements will have their reference numerals primed. As best seen in FIG. 5, the sealing device 40' has a tube portion 42', the connector portion 44, packing 46', the valve seal 48 and a packing retainer 49'.

Referring to FIG. 6, the tube portion 42' is relatively similar to the tube portion 42 of FIG. 3. However, in addition to the tubular body 50 having the top end 51 and the bottom end 52, the peripheral surface 53, the shoulder 54, the through bore 56, the first counterbore 58, and the second counterbore 60, the tube portion 42' has a third counterbore 61' concentric with the through bore 56 and extending therein from the top end 51 of the tube portion 42'. Furthermore, a second annular groove 65' is defined at the top end 68 of the tube portion 42'. An upper portion of the peripheral surface 53 is threaded.

Still referring to FIG. 6, the packing retainer 49' is shown having a first tubular body 80 and a second tubular body 82. The second tubular body 82 is concentrically disposed with respect to the first tubular body 80. The first tubular body 80 and the second tubular body 82 share a top end 84. However, the second tubular body 82 is shorter than the first tubular body 80. An underside 86 of the top end 84 defines an annular protrusion 88. The first tubular body 80 is tapped, so as to threadingly engage with the threads on the upper portion of the peripheral surface 53 of the tube portion 42'.

The sealing device 40' is mounted to the modulating valve 10 by the connector portion 44, as described for the first embodiments of FIGS. 1 to 3. However, the sealing of the actuation rod 24 is performed by putting packing 46' into the third counterbore of the tube portion 42'. Thereafter, the packing retainer) 49' is screwed onto the tube portion 42', and the second tubular portion 82 compresses the packing 46' so as to ensure the integrity of the sealing between the actuation rod 24 and the tube portion 42'. The annular protrusion 88 ensures the precise positioning of the packing retainer 49' on the tube portion 42' by nesting into the second annular groove 65'. Various types of packing 46' may be used, such as carbon/graphite packing, synthetic braids coated with PTFE, PTFE or other similar materials.

It is within the ambit of the present invention to cover any obvious modifications of the embodiments described herein, provided such modifications fall within the scope of the appended claims.

What is claimed is:

1. A sealing device for a modulating valve of the type having a valve body defining a flow passage, at least one inlet and one outlet, a valve displaceable in the flow passage to control an opening of the flow passage, and actuation means having an actuator rod rotatably coupled to the valve at an exterior of the valve body for displacing the valve in the flow passage, the sealing device comprising
   a body surrounding the actuator rod of the modulating valve, the body defining a receptacle for accommodating a coupling between the actuator rod and the valve so as not to impede on the actuation of the valve by the actuator rod;
   connection means adapted to secure the body of the sealing device to the valve body, the connection means being a tubular member being adapted to be threadingly engaged to the valve body, the tubular member compressing the body of the sealing device against the valve body such that a first one of the sealing means is squeezed between the body of the sealing device and the valve body; and
   sealing means between the body of the sealing device and the actuator rod and between the body of the sealing device and the valve body, to prevent fluid flow therebetween, said body of the sealing device and said sealing means being adapted to conceal and contain fluid leaks between one of the valve and the actuator rod, and the valve body, whereby no fluid is lost due to a leaking modulating valve.

2. The sealing device according to claim 1, wherein the fluid is a refrigerant.

3. The sealing device according to claim 1, wherein the valve has an actuator stem rotatably coupled with the actuator rod, with the receptacle accommodating the coupling between the actuator stem and the actuator rod.

4. The sealing device according to claim 3, wherein the valve body has a generally planar surface generally perpendicular to the actuator stem, with a first one of the sealing means being positioned between the body of the sealing device and the planar surf ace of the valve body.

5. The sealing device according to claim 1, wherein the sealing means are at least one of seals and packing.

6. The sealing device according to claim 1, wherein the tubular member has an inner cavity surrounding the body of the sealing device, the inner cavity of the tubular member having an inner lip at an end of the tubular member distal from the valve body, the inner lip compressing the body of the sealing device against the valve body when the tubular member is threadingly engaged to the valve body.

7. The sealing device according to claim 6, wherein the inner lip abuts against a shoulder on a peripheral surface of the body of, the sealing device.

8. The sealing device according to claim 1, wherein the sealing means between the body of the sealing device and the actuator rod is packing, with the sealing device having a cover member connectable to an end of the body of the sealing device distal from the valve body, the cover member having, a sleeve accommodatable between the body of the sealing device and the actuator rod to contain the packing therebetween.

9. The sealing device according to claim 8, wherein the cover member is threadingly engaged to the body of the sealing device.

10. The sealing device according to claim 1, wherein the sealing means consists of a first sealing means between the body of the sealing device and the actuator rod and a second sealing means between the body of the sealing device and the valve body.

11. The sealing device according to claim 10, wherein the first sealing means are at least one of seals and packing, and the second sealing means is at least one seal.

12. The sealing device according to claim 1, wherein the connection means in not integrally formed with the body.

13. A sealing device for a modulating valve of the type having a valve body defining a flow passage, at least one inlet and one outlet, a valve displaceable in the flow passage to control an opening of the flow passage, and actuation means having an actuator rod rotatably coupled to the valve at an exterior of the valve body for displacing the valve in the flow passage, the sealing device comprising:
   a body surrounding the actuator rod of the modulating valve, the body defining a receptacle for accommodating a coupling between the actuator rod and the valve so as not to impede on the actuation of the valve by the actuator rod;
   connection means adapted to secure the body of the sealing device to the valve body;
   sealing means between the body of the sealing device and the actuator rod and between the body of the sealing device and the valve body, with the sealing means between the body of the sealing device and the rod being packing, to prevent fluid flow therebetween, said body of the sealing device and said sealing means being adapted to conceal and contain fluid leaks between one of the valve and the actuator rod, and the valve body, whereby no fluid is lost due to a leaking modulating valve; and a cover member connectable to an end of the body of the sealing device distal from the valve body, the cover member having a sleeve accommodatable between the body of the sealing device and the actuator rod, to contain the packing therebetween.

14. The sealing device according to claim 13, wherein the cover member is threadingly engaged to the body of the sealing device.

* * * * *